UNITED STATES PATENT OFFICE

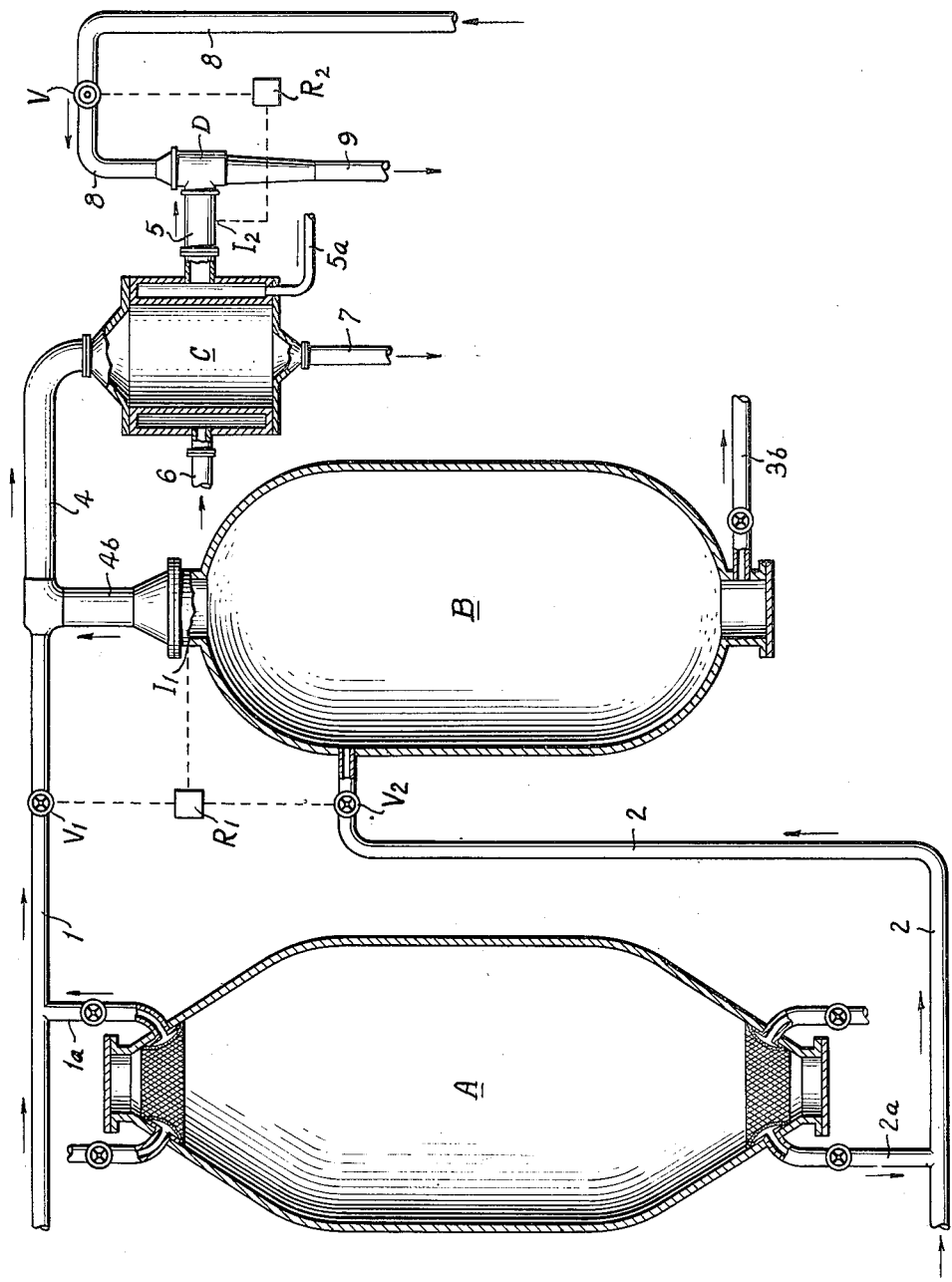

2,494,098

AUTOMATICALLY CONTROLLED RECOVERY OF HEAT AND SO₂ GAS FROM RELIEF GASES AND WASTE LIQUOR

Carl Johan Lockman, Enebyberg, Sweden, assignor to American Heat Reclaiming Corporation, New York, N. Y.

Application June 22, 1943, Serial No. 491,850
In Sweden May 30, 1942

Section 1, Public Law 690, August 8, 1946
Patent expires May 30, 1962

1 Claim.  (Cl. 92—11)

The present invention relates to systems for recovery of heat and $SO_2$-gas from relief gases and waste liquor as available in the cooking of sulphite cellulose, and more particularly to such plants in which the cooking process is ended by more or less relieving the pressure in the digester to reclaim the gases thus obtainable and passing the waste liquor from the digester while still under a certain pressure, to a separate expansion chamber maintained at a lower pressure so as to cause the liquor to liberate vapours therein, with the further purpose of using those gases and vapours for indirectly heating water, fresh cooking acid or some other liquid and then as they are thereby cooled under condensing of their steam content utilizing the remaining concentrate of $SO_2$-gas for conditioning the raw acid, for instance.

Formerly it was customary to interrupt the relieving of the digester before the waste liquor was discharged therefrom and to supply the relief gases and the vapours given off by the waste liquor either to different heat exchange devices or each at a different time to one and the same apparatus of the recovery system. In each of these cases the load on the heat exchangers will obviously vary a great deal and under the circumstances mentioned there is no practical possibility of so regulating the operations that the heat exchangers may continuously work with the constant load, if still more serious inconveniences are to be avoided. Therefore, the heat exchangers must be made much bigger than necessary to handle the mean load and the efficiency of the plant will be relatively low so that the plant will be unduly expensive.

It is an object of the invention to carry out the operations referred to in such a manner that both the relief gases and the vapours given off by the waste liquor may be conducted to one and the same heat exchange system at least partly together in order to render the load on the same more evenly than otherwise.

Another object of the invention is to control the steps of relieving the digester and the discharging of the waste liquor therefrom in dependence of each other and of the load on the heat exchange system which is required to maintain an approximately constant load on the same.

A further object of the invention is to provide suitable means for realization of the new methods in view.

Still other objects of the invention will be apparent from the following.

The main feature of the invention consists in continuing to relieve the digester at least partly during the discharging of the waste liquor therefrom, and conducting the relief gases and the vapours which are caused to be liberated by the liquor, as described, to a common space maintained at about the same pressure as the chamber in which said vapours are generated, from which space the gases and vapours are supplied to a heat exchange system for the desired purpose.

Thus, without any loss of time in emptying the digester or other inconveniences, the load on the heat exchange system will be better balanced because when the supply of relief gases tends to decrease as the pressure in the digester is falling there is added a certain amount of vapours liberated from the waste liquor and the operations may easily be regulated so as to attain full compensation.

According to the invention a preferred mode of performing the method is to regulate the relieving of the digester and the discharging of waste liquor therefrom in dependence of the pressure of the chamber to which the liquor is passed for liberating vapours or the pressure of the space for collecting the relief gases and said vapours, or of the temperature of these fluids when leaving the heat exchange device so that said pressures and temperature, respectively, remain approximately constant within certain limits while the pressure at the outlet of the same fluids from the heat exchange device is also maintained substantially constant independent of the passing quantities, provided that the medium to be heated therein is supplied at a rather even rate.

It is obvious that under these conditions the heat exchange device will work with an approximately constant drop of pressure of the hot fluids and with a practically unvarying cooling effect and thus the desired even load is maintained.

This may be most simply and advantageously realized by discharging waste liquor from the digester at the proper moment to make vapours available for compensating the decreasing delivery of relief fluids so that a tendency towards an increase in said pressures or temperature, throttles the withdrawal of either the relief gases or the waste liquor from the digester, or if necessary first shuts off the flow of one of the fluids and then throttles the other, until such tendency has ceased, whereas a tendency towards a decrease in said pressures or temperature reverses the proceeding so that the flow which was last throttled is now first opened and then the flow which was first throttled may be more or less opened as required to maintain the desired conditions.

The nature of the invention will be more clearly understood by the following description of one embodiment of a plant according to the same which, by way of example, is shown more or less diagrammatically in the accompanying drawing.

In the drawing A designates a sulphite digester with the valved top relief pipe $1a$ which is connected to a relief gas main header $1$. From the bottom of the digester the valved waste liquor pipe $2a$ leads to the waste liquor main header $2$ which conducts the liquor to the top of the expansion chamber B. In this chamber the liquor is subjected to a drop of pressure so as to liberate vapours and then it is withdrawn therefrom through the bottom discharge pipe $3b$ whereas the vapours obtained are conducted through the top outlet pipe $4b$ to a collecting space in the form of a conduit $4$ for these vapours and the relief gases which flow thereto from the header $1$. In the gas and liquor headers $1$ and $2$, respectively, there are provided regulating valves $V_1$ and $V_2$, respectively, both of which may be automatically controlled by a single governing device $R_1$ under the influence of the pressure sensitive member $I_1$ which responds to variations of pressure in the system consisting of the expansion chamber B, the vapour outlet pipe $4b$ and the conduit $4$ so as to actuate the governing device $R_1$ in response to variations in that pressure. From the conduit $4$ the relief gases and the other vapours are supplied to a heat exchange device C serving as gas cooler on one hand and as preheater for fresh cooking acid or wash water on the other hand. This heat exchanger is assumed to be of the known spiral plate type and the liquor to be heated is supplied to the same by the inlet pipe $6$ and withdrawn in heated condition through the outlet pipe $7$ whereas the condensates of the gases and vapours are discharged through the outlet pipe $5a$ and the uncondensible gases leave through outlet pipe $5$. The escaping gases which mainly consist of cooled and concentrated $SO_2$-gas are passed through the absorption ejector D together with raw acid supplied by the pipe $8$ under such control of the acid supply that the $SO_2$-gas is completely dissolved by the raw acid which is then conducted through the pipe $9$ to an acid tank, for instance. By a proper control of the acid supply, as may be effected by the regulating valve V operated by the governing device $R_2$ under influence of the pressure sensitive member $I_2$ which responds to variations in the pressure at the gas inlet to the ejector, this pressure and consequently also the gas pressure at the outlet from the heat exchanger is kept approximately constant. Thus, if the pressure in the outlet $5$ of the condenser increases, the member $I_2$ increases the opening of the valve V so as to admit raw acid at a faster rate to the jet condenser $D_2$ which increases the rate of absorption of the $SO_2$-gas and hence reduces the pressure in the outlet $5$.

The various parts and accessories of the plant described are all so well known to the art that they would need no more detailed explanation since, moreover, there may be used any suitable conventional embodiment of the same.

The manner of operation is as follows: During the periods of cooking when no relief gases and other vapours are available the valves $V_1$ and $V_2$ in the gas and waste liquor headers $1$ and $2$, respectively, are open whereas naturally the relief and waste liquor pipes $1a$ and $2a$, respectively, are closed. Upon completion of the cooking process in the digester, first the relief pipe $1a$ is opened to permit relief gases to flow through the header $1$ and the conduit $4$ to the heat exchanger C in which the gases are cooled by a constant stream of liquid as mentioned so that they leave the heat exchanger in the form of a concentrate of $SO_2$-gas at a constant pressure maintained by the ejector D and its controlling device $R_2$. If now the pressure at the gas inlet to the heat exchanger C shows a tendency to rise so that the pressure on the member $I_1$ begins to surpass the value for which that member is set, the effect will be that the governing device $R_1$ will throttle the valve $V_1$ so that the delivery of relief gases to the heat exchanger C is decreased as required to maintain the former equilibrium, and hence the desirable load on the heat exchanger. When after a time the pressure in the digester has been relieved to a suitable value or has fallen so low that sufficient relief gas cannot be supplied to maintain the desired working conditions of the heat exchanger C, the waste liquor pipe $2a$ of the digester is opened so that the waste liquor is forced out of the digester by the prevailing pressure and conducted through the liquor header $2$ to the expansion chamber and therein caused to liberate vapours as described. These vapours which escape through the outlet pipe $4b$ and are mixed with the relief gases in the conduit $4$ will thus compensate for the decreasing supply of relief gases. In case this is followed by a rise in the pressure of the pipe system $4b$—$4$ above the predetermined value, the initiating member $I_1$ will actuate the governing device $R_1$ so as to first throttle the valve $V_1$ and thereby cause a decrease in the delivery of relief gases or possibly shut off the same entirely and should this still not be sufficient to reestablish the pressure balance the governor $R_1$ will also throttle the valve $V_2$ so that the flow of waste liquor is decreased and thereby the generation of vapours therefrom is likewise decreased until the desired balance is attained. Thus, the load on the heat exchanger C is still maintained constant and should an opposite tendency towards falling pressure in the spaces mentioned occur the reverse proceeding will take place so that the governor $R_1$ will be caused by the initiating member $I_1$ first to open the valve $V_2$ and thereby increase the liquor flow and generation of vapours therefrom and then open the valve $V_1$ and thereby increase the delivery of relief gases if required to maintain the desired conditions.

Since the composition of the mixture between the gases from the digester and the vapours from the expansion chamber may be considered to be practically constant it is obvious that under the conditions called for the heat exchanger C will be working with an approximately constant load. Thus, the heat exchanger is utilized very efficiently in a manner admitting a satisfactory reclaiming of the heat and $SO_2$-content of the gases and vapours and besides by the method described there may be attained a certain reduction of the time necessary for relieving the digester and withdrawing the waste liquor therefrom.

The mode of operation described is generally preferred because in that case the pressure in the digester will not fall to a lower level than required to blow out the waste liquor.

The most convenient control devices in practice have proved to be those with a pressure sensitive member but it is also possible to use a temperature sensitive member placed in the gas outlet of the heat exchange apparatus since such an arrangement should at least theoretically give equivalent results.

Naturally it is possible to modify the method and means according to the invention in many other respects without departing from the scope thereof and it is understood that the plant may consist of any number of units which are caused to cooperate in a suitable manner and that the invention is not limited otherwise than by the appended claim.

Thus what I claim and desire to secure by Letters Patent is:

In the operation of a sulphite cellulose plant having a digester, an expansion chamber, a surface heat exchanger for extracting heat from and concentrating $SO_2$ vapors from products taken from the digester, a first valved connection from the vapor space of the digester to the heat exchanger, a second valved connection from the liquid space of the digester to the expansion chamber and a connection from the vapor space of the expansion chamber communicating through said first connection to said heat exchanger, that improvement in the process of recovering heat and $SO_2$ gas while relieving said digester at the end of a cooking cycle which includes the steps of relieving the digester by throttled flow of relief gas and liquid from the digester through said first and second connections, respectively, whereby to maintain the pressure in the digester higher than that in the expansion chamber and heat exchanger and thereby supply to the heat exchanger a mixture of gases comprising relief gases flowing from the vapor space of the digester and gases flashed due to pressure drop from the liquid flowing to the expansion chamber, and automatically maintaining the pressure of gases supplied to said heat exchanger at a substantially constant predetermined value by providing automatic means operable responsive to a drop in pressure of said mixture below said value to automatically reduce the degree of throttling of the flow of liquid and gas through said second and said first connections, respectively, in sequence in the order named, and thereby providing the additional supply of gas required to maintain the predetermined pressure primarily from additional liquid drawn from the digester and flashed in said expansion chamber, said automatic means also operating to increase the degree of throttling of the flow of gas and liquid through said first and second connections, respectively, in sequence in the order named responsive to an increase in pressure of said mixture above said predetermined value.

CARL JOHAN LOCKMAN.

REFERENCES CITED

The following references are of record in the file of this patent:

UNITED STATES PATENTS

| Number | Name | Date |
|---|---|---|
| 833,936 | Morterud | Oct. 23, 1906 |
| 1,327,666 | Fagan et al. | Jan. 13, 1920 |
| 1,645,754 | Howell | Oct. 18, 1927 |
| 1,670,156 | Howell | May 15, 1928 |
| 1,699,556 | Wolf | Jan. 22, 1929 |
| 1,703,745 | Morterud | Feb. 26, 1929 |
| 1,780,638 | Wolf | Nov. 4, 1930 |
| 1,908,615 | Oman | May 9, 1933 |
| 1,955,057 | Dunbar | Apr. 17, 1934 |
| 2,029,360 | Dean | Feb. 4, 1936 |
| 2,221,066 | Kahle | Nov. 12, 1940 |

FOREIGN PATENTS

| Number | Country | Date |
|---|---|---|
| 252,412 | Germany | Oct. 21, 1912 |

OTHER REFERENCES

Technical Association Papers, Series 20, pages 346 to 348 and 118 to 126 (1937).